(12) United States Patent
Schmaling et al.

(10) Patent No.: US 6,848,886 B2
(45) Date of Patent: Feb. 1, 2005

(54) SNUBBER

(75) Inventors: David N. Schmaling, Southbury, CT (US); Francis E. Byrnes, White Plains, NY (US)

(73) Assignee: Sikorsky Aircraft Corporation, Stratford, CT (US)

( * ) Notice: Subject to any disclaimer, the term of this patent is extended or adjusted under 35 U.S.C. 154(b) by 26 days.

(21) Appl. No.: 10/418,381

(22) Filed: Apr. 18, 2003

(65) Prior Publication Data

US 2004/0208745 A1 Oct. 21, 2004

(51) Int. Cl.[7] .............................................. B64C 11/12
(52) U.S. Cl. .................... 416/134 A; 416/141
(58) Field of Search ............................ 416/134 A, 140, 416/141

(56) References Cited

U.S. PATENT DOCUMENTS

| | | |
|---|---|---|
| 4,105,266 A | 8/1978 | Finney |
| 4,244,677 A | 1/1981 | Noehren et al. |
| 5,092,738 A | 3/1992 | Byrnes et al. |
| 5,188,513 A | 2/1993 | Byrnes |

*Primary Examiner*—Edward K. Look
*Assistant Examiner*—Dwayne White
(74) *Attorney, Agent, or Firm*—Bachman & LaPointe, P.C.

(57) ABSTRACT

A snubber inner member has a doubly convex outer surface portion having a central longitudinal axis. A shim/spacer stack secured to the outer surface portion couples the snubber inner member to the second member. A retainer having one or more engagement surfaces cooperates with one or more engagement surfaces of the snubber inner member to constrain lateral movement of the snubber inner member relative to the retainer while permitting longitudinal movement of the snubber inner member away from the retainer. An elastomer secures the retainer to the first member.

20 Claims, 3 Drawing Sheets

SNUBBER

BACKGROUND OF THE INVENTION (1) Field of the Invention

This invention relates to elastomeric bearings, and more particularly to elastomeric bearings used in helicopter main rotor and tail rotor assemblies.

(2) Description of the Related Art

Snubber/damper units are well known in the field of helicopter rotor technology. Exemplary snubber/damper units are shown in U.S. Pat. Nos. 5,188,513, 5,092,738, 4,244,677, and 4,105,266. An exemplary snubber/damper is used in a bearingless rotor application to accommodate relative movement and orientation changes of an inner blade member to an outer blade or mounting member. In a common implementation, two snubber/damper subunits are mounted on opposite sides of the inner member. The subunits include a spherical stack of bonded metallic shims and elastomeric spacers to accommodate pitch and flap motions and a flat stack to accommodate lead-lag and, if present, longitudinal motions. The spherical stack is commonly identified as the snubber and the flat stack is commonly identified as the damper. In a common configuration, the spherical layers of the two subunits are concentric.

BRIEF SUMMARY OF THE INVENTION

Accordingly, one aspect of the invention involves a snubber system for permitting relative rotation of a first member and a second member. A snubber inner member has a doubly convex outer surface portion having a central longitudinal axis. A shim/spacer stack secured to the outer surface portion couples the snubber inner member to the second member. A retainer having one or more engagement surfaces cooperates with one or more engagement surfaces of the snubber inner member to constrain lateral movement of the snubber inner member relative to the retainer while permitting longitudinal movement of the snubber inner member away from the retainer. An elastomer secures the retainer to the first member.

In various implementations, the shim/spacer stack may be outwardly doubly convex and the snubber system may further have a flat shim/spacer stack coupling the outwardly doubly convex shim/spacer stack to the second member. The snubber system may include a second such inner member, shim/spacer stack, retainer, and elastomer, opposite the first. The shim/spacer stack may consist essentially of a number of metallic shims and a number of elastomeric spacers secured to each other as a unit. The snubber inner member may have a flange extending radially outward beyond an inboard portion of the doubly convex outer surface portion. The snubber inner member one or more engagement surfaces may comprise a perimeter portion of a socket and the retainer one or more engagement surfaces may comprise an outwardly projecting projection.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
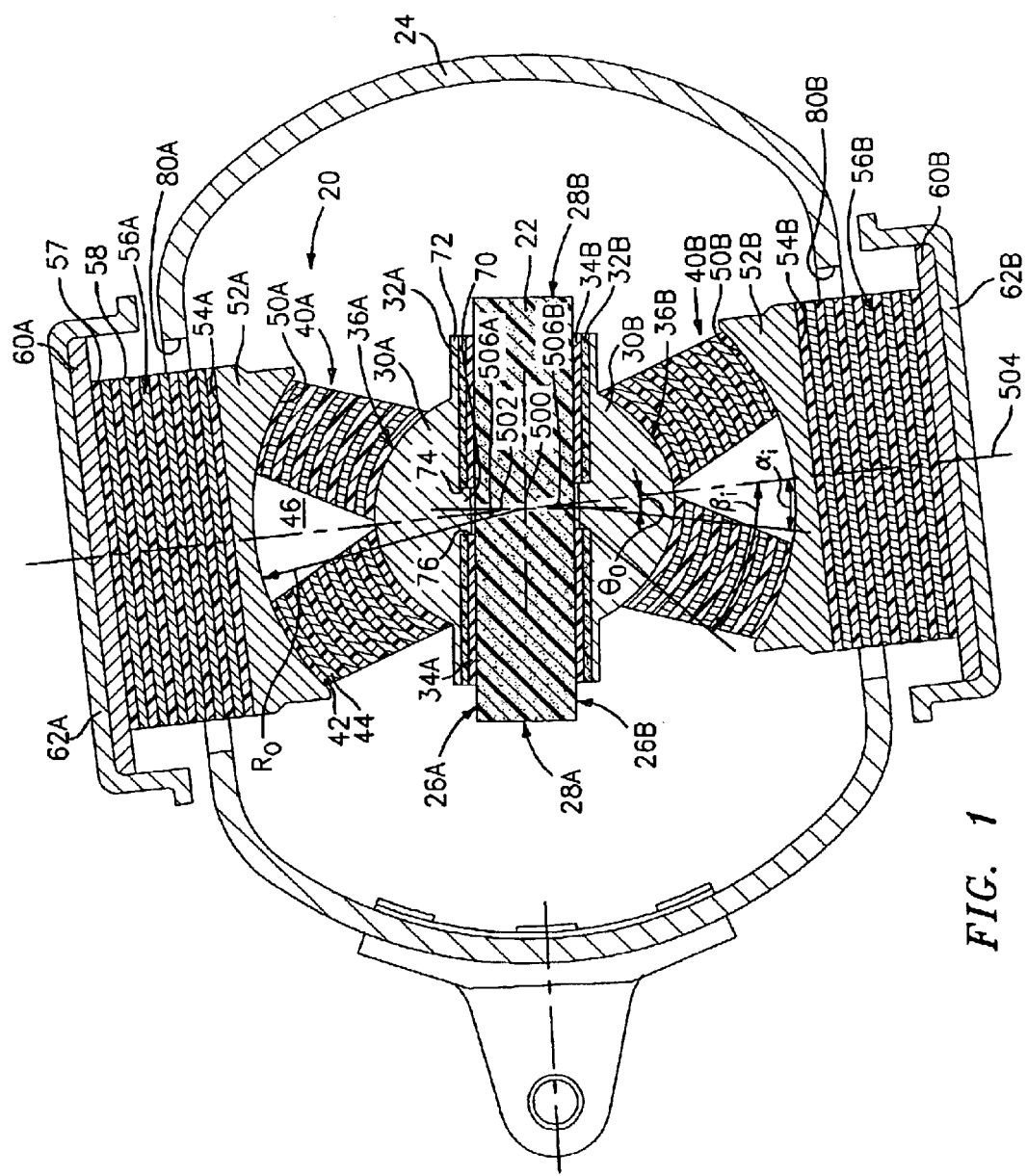
FIG. 1 is a sectional view of a snubber/damper in a neutral condition.

FIG. 1 shows a snubber/damper system 20 which couples an inner member 22 to an outer member 24. In use, the inner member 22 is a root portion of a helicopter rotor blade flexbeam. The exemplary outer member 24 is a torque tube portion of the blade extending outward and secured to a distal portion of the flexbeam (e.g., via bolts). The exemplary inner member 22 has an elongate cross-section transverse to its central longitudinal axis 500. The inner member 22 and this cross-section have a top 26A and a bottom 26B and relatively shorter sides 28A and 28B. In the exemplary implementation, the snubber/damper system 20 holds the inner member 22 in a neutral orientation relative to the outer member 24 wherein the central top/bottom surface normal 502 of the flexbeam is pitched at an angle $\theta_0$ relative to an axis 504 of the snubber/damper system.

The exemplary snubber/damper system 20 includes similar components above and below the inner member 22. The core of the upper and lower halves of the snubber/damper system is a respective upper and lower snubber inner member 30A, 30B. Each inner member is coupled to the associated top or bottom surface by a retainer 32A, 32B and pad 34A, 34B (both described in further detail below). Each inner member 30A, 30B has an outboard spherical surface portion 36A, 36B. The respective spherical surface portions 36A, 36B have centers of curvature 506A and 506B which, in the neutral condition, fall along the axis 504 spaced outward from its intersection with the flexbeam central axis 500. A shim/spacer stack 40A, 40B is secured to each inner member 30A, 30B. Each stack 40A, 40B has alternating elastomeric spacers 42 and metal shims 44 secured to each other. The spacers and shims each have inboard and outboard surfaces with centers of curvature at the associated center 506A, 506B. The exemplary spacers and shims are annular, leaving each stack 40A, 40B with a central cavity 46 provided by the shim/spacer central apertures. The outboard surface of each stack is secured to an inboard surface 50A, 50B of a metallic adapter or transition shim 52A, 52B. The surfaces 50A, 50B are concentric with their respective shim stacks and inner member outer surfaces. The adaptors 52A, 52B each have a flat outer surface 54A, 54B. An outer (damper) shim/spacer stack 56A, 56B has spacers 57 and shims 58. Each stack 56A, 56B has an inboard surface secured to the outer surface 54A, 54B and an outboard surface secured to a plate 60A, 60B. Each plate 60A, 60B is captured within an associated cap 62A, 62B secured to the outer member 24 such as by bolts (not shown) to hold the shim/spacer stacks in compression. The compression provides a desired precompression of the elastomeric spacers.

The retainers 32A, 32B serve to support and retain the associated inner members 30A, 30B. The elastomeric pads 34A and 34B provide strain isolation between the inner member 22 and the retainers 32A and 32B. Accordingly, the pads may advantageously be relatively thick. An exemplary uncompressed pad thickness is 0.025 inch. An exemplary range of uncompressed thicknesses is 0.010–0.040 inch, more narrowly, 0.015–0.035 inch. An exemplary pad material is natural rubber (e.g., per ASTM D 2000). An exemplary retainer material is chopped glass fiber in resin (e.g., per MIL-M-46069) and an exemplary retainer thickness is 0.065 inch. The exemplary snubber inner members have central depending projections 70 and outboard radially-extending flanges 72. The projections 70 are received within apertures 74 and 76 in the associated retainer and pad, respectively. The flanges 72 serve to provide angular stability to the snubber inner members. In an exemplary embodiment, the flanges 72 are not captured beneath a retainer clip.

Figure 2:
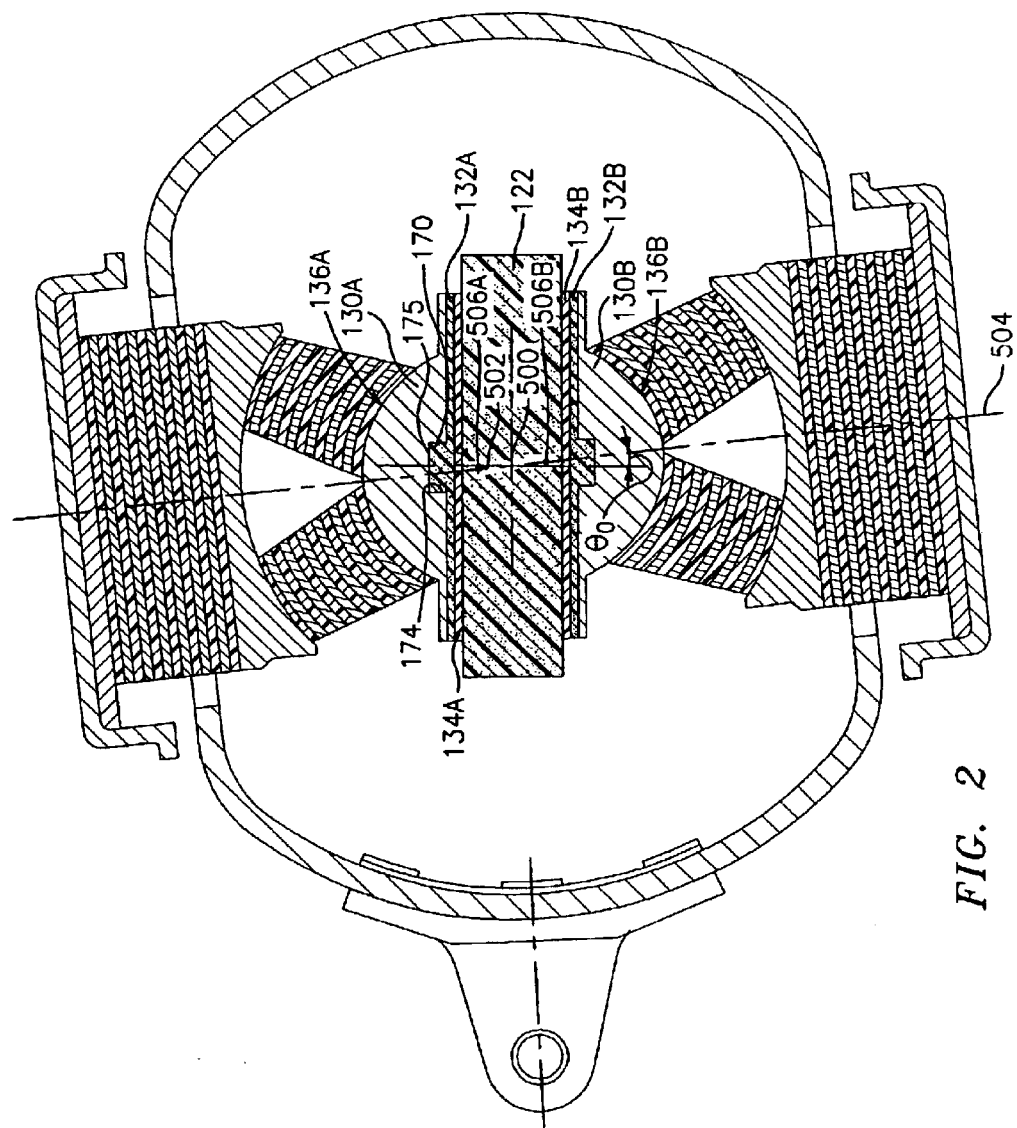
FIG. 2 is a sectional view of an alternate snubber/damper in a neutral condition.

FIG. 2 shows an alternate inner member mounting configuration in which the cooperating interengaged mounting features of the inner member and retainer are reversed from those of FIG. 1. In the illustrated embodiment, each inner member 130A, 130B has a socket 174 extending toward the surface 136A, 136B from the underside of the inner member. A complementary projection 170 extends from the outboard surface of the associated retainer 132A, 132B. The retainer may advantageously be metallic (e.g., Al or Ti alloys). In the exemplary embodiment, each pad 134A, 134B lacks the central aperture of the FIG. 1 pads. In the exemplary embodiment, the projection 170 and socket 174 are largely right circular cylinders. The projection 170 has a principal radius and a flat distal end surface 175 a given height above the remaining outboard surface of the retainer. The socket has a principal diameter slightly greater than the local projection diameter to provide a light friction fit. The root of the projection may be radiused slightly for strength and the mouth of the socket may have a complementary bevel. The depth of the socket may be slightly greater than the height of the projection. Such a configuration permits a relatively greater engaged height between projection and socket than do the features of FIG. 1 for a given retainer/pad thickness. The height is advantageously effective to maintain engagement during peak loads and motions in view of expected reduction in pre-compression due to creep in the spacers over time. The projection transverse dimension is advantageously sufficient to control wear of the projection. The circular projection and socket are easy to manufacture. They are of effective cross-section to transfer the lead-lag forces. An exemplary range of projection diameter is 0.4 inch–1.2 inch and an exemplary range of projection height is 0.1 inch–0.3 inch depending on design loading. An exemplary range of retainer thickness beyong the projection is 0.050 inch–0.150 inch.

To assemble the snubber, the undersides of the retainers may be bonded to the outboard surfaces of the pads and the undersides of the pads then bonded to the flexbeam. The flexbeam may be positioned in the outer member 24. The two bonded stacks, extending from the respective snubber inner members 30A and 30B to the plates 60A and 60B, are inserted through respective apertures 80A and 80B in the outer member. The caps 62A and 62B are then secured to the outer member 24 to precompress the snubber (FIG. 2). The preload is such that, given the snubber geometry and the radius of curvature of the surface 36A, 36B, during normal operation the snubber inner members will remain compressively engaged to the associated retainers.

Figure 3:
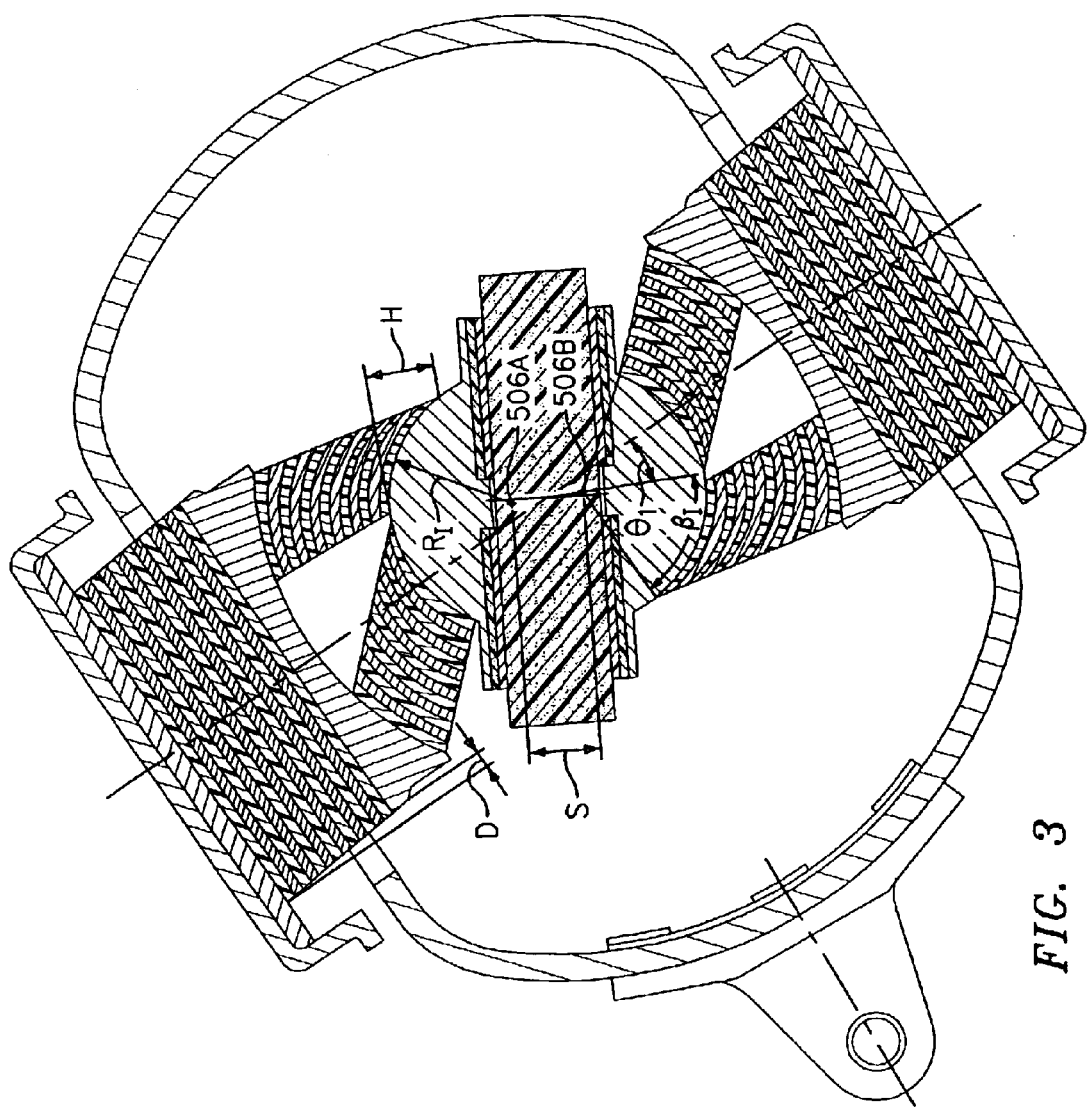
FIG. 3 is a sectional view of the snubber/damper of FIG. 1 in a pitched condition.

FIG. 3 shows the system 20 in a strained condition having a pitch angle $\theta_1$ for a net pitch from neutral of $\theta_1-\theta_0$. This movement produces shearing of the spacers in both the inner and outer shim/spacer stacks. In the exemplary embodiment, $R_I$ designates the radius of curvature of the inner member spherical surface portions, H designates the height of contact between the spherical surface portion and the adjacent spacer, and S indicates the separation between the centers of curvature. The presence of a positive S provides increased H at a given $R_I$. The non-zero S causes a shear displacement D accommodated by the outer stacks. D is substantially sin $(\theta_1-\theta_0)*S/2$. For a 25° net pitch with a value S of 1.0 inch, the resulting D is 0.211 inch. Because there are typically phase differences between lead/lag and pitch, this increased motion may typically be accommodated with little change to the dampers (e.g., with slight increase in elastomer spacer thickness). If the lead lag motion is simultaneously present, the presence of two opposed dampers means that the pitch-induced increased damping of one damper is largely compensated for by the opposite pitch induced decreased damping of the other damper. The increased height also permits a relatively greater wrap angle $\beta_I$. Where $\beta_I$ is the half wrap angle of the spacer along the inner member outboard surface. For any given spacer layer, that spacer has a wrap angle $\beta_i$ (FIG. 1) and a central aperture half angle $\alpha_i$.

The axial and side load pressures $P_A$ and $P_S$ within a snubber spacer layer is:

$$P_A=(\text{Preload}/\pi R_i \sin \phi_i)(\cos((\theta_1-\theta_0)(R_O-R_i)/(R_O-R_I))/2 \cos \phi_i)$$

$$P_S=(\text{Preload}/\pi R_i \sin \phi_i)(\sin((\theta_1-\theta_0)(R_O-R_i)/(R_O-R_I))/\sin \phi_i)$$

where: $(\theta_1-\theta_0)$ is the bearing pitch angle; $R_O$ (FIG. 1) and $R_I$ (FIG. 3) are respective outer and inner radii of the outboardmost and inboardmost spacers; the subscript i designates the particular layer from inboardmost to outboardmost; $\phi_i$ is $(\beta_i+\alpha_i)/2$.

For the spacer to remain in compression, $P_A-P_S \geq 0$ therefore:

$$(\cos((\theta_1-\theta_0)(R_O-R_i)/(R_O-R_I))/2 \cos \phi_i) > (\sin((\theta_1-\theta_0)(R_O-R_i)/(R_O-R_I))/\sin \phi_i)$$

The stress will typically be greatest at the inboardmost layer at which $R_i$ is approximately $R_I$ and thus $(R_O-R_i)/(R_O-R_I)=1$ Solving for $P_A-P_S=0$:

$$(\sin \phi_i)/(2 \cos \phi_i)=\tan(\theta_1-\theta_0)$$

For the outboardmost spacer, $R_i$ is approximately $R_O$ and thus $(R_O-R_i)/(R_O-R_I)=0$. Accordingly the required wrap angle is not pitch driven at this layer.

The required $\phi_i$ for the inboardmost layer can thus be determined for a desired maximum pitch angle from:

$$(\sin \phi_i)/(2 \cos \phi_i)=\tan(\theta_{1max}-\theta_0)$$

The bearing shear stress $\gamma$ due to pitch is:

$$\gamma \approx (\theta_1-\theta_0)((R_O+R_I)/2)/\tau$$

where $\tau$ is the overall elastomer thickness which may be approximately $R_O-R_I$ if the shim thickness is very small.

The foregoing may be utilized to engineer snubber geometry. For example, the engineering considerations may include a need to accommodate a given max. bearing pitch angle. The combined flexbeam and retainer thickness may be a given (e.g., a minimum thickness dictated by strength considerations). It may be desired to minimize overall snubber/damper height. The required $\phi_i$ for the inboardmost layer can be calculated as described above. The bearing shear stress $\gamma$ at the max. bearing pitch angle may also be calculated as described above. The effective snubber height may substantially be related to the sum of $R_O$ and S/2. The available $R_I$ to achieve a given inboardmost layer wrap angle will depend upon S and the combined thickness of the flexbeam, the retainers, and the inner member flange. A thickness-minimizing configuration may be iteratively solved based upon these parameters and stress analyses conducted to verify that, at the maximum pitch angle stresses are within acceptable limits.

One or more embodiments of the present invention have been described. Nevertheless, it will be understood that various modifications may be made without departing from the spirit and scope of the invention. For example, when applied as a reengineering of an existing snubber/damper, details of the existing snubber/damper and its environment may particularly influence details of the implementation. Accordingly, other embodiments are within the scope of the following claims.

What is claimed is:

1. A snubber system for permitting relative rotation of a first member and a second member comprising:
   a snubber inner member having a doubly convex outer surface portion having a central longitudinal axis;
   a shim/spacer stack secured to the outer surface portion and coupling the snubber inner member to the second member;
   a retainer having one or more engagement surfaces cooperating with one or more engagement surfaces of the snubber inner member to constrain lateral movement of the snubber inner member relative to the retainer while permitting longitudinal movement of the snubber inner member away from the retainer and the first member; and
   an elastomer securing the retainer to the first member.

2. The snubber system of claim 1 wherein said shim/spacer stack is an outwardly doubly convex shim/spacer stack and the snubber system further comprises:
   a flat shim/spacer stack coupling the outwardly doubly convex shim/spacer stack to the second member.

3. The snubber system of claim 1 wherein the snubber inner member, shim/spacer stack, retainer, and elastomer are a first snubber inner member, shim/spacer stack, retainer and elastomer and the system further comprises:
   a second snubber inner member having a doubly convex outer surface portion sharing said central longitudinal axis;
   a second shim/spacer stack secured to the outer surface portion of the second snubber inner member and coupling the second snubber inner member to the second member axially opposite the first snubber member;
   a second retainer having an engagement surface cooperating with an engagement surface of the second snubber inner member to constrain lateral movement of the second snubber inner member relative to the second retainer while permitting longitudinal movement of the second snubber inner member away from the second retainer;
   a second elastomer securing the second retainer to the first member.

4. The snubber system of claim 1 wherein the shim/spacer stack consists essentially of a plurality of metallic shims and a plurality of elastomeric spacers secured to each other as a unit.

5. The snubber system of claim 1 wherein:
   the snubber inner member has a flange extending radially outward beyond an inboard portion of the doubly convex outer surface portion.

6. The snubber system of claim 1 wherein:
   the snubber inner member one or more engagement surfaces comprise a perimeter portion of a socket and the retainer one or more engagement surfaces comprise an outwardly projecting projection.

7. The snubber system of claim 1 wherein:
   the first member is an aircraft blade flexbeam.

8. The snubber system of claim 7 wherein:
   the second member is an aircraft blade torque tube.

9. A snubber system for permitting relative rotation of a first member and a second member comprising:
   a snubber inner member having a doubly convex outer surface portion having a central longitudinal axis;
   a shim/spacer stack secured to the outer surface portion and coupling the snubber inner member to the second member; and
   means for constraining lateral movement of the snubber inner member relative to the first member while permitting longitudinal movement of the snubber inner member away from the first member.

10. The snubber system of claim 9 wherein said shim/spacer stack is an outwardly doubly convex shift/spacer stack and the snubber system further comprises:
    a flat shim/spacer stack coupling the outwardly doubly convex shim/spacer stack to the second member.

11. The snubber system of claim 9 wherein the snubber inner member, shim/spacer stack, and means are a first snubber inner member, shim/spacer stack, and means and the system further comprises:
    a second snubber inner member having a doubly convex outer surface portion sharing said central longitudinal axis;
    a second shim/spacer stack secured to the outer surface portion of the second snubber inner member and coupling the second snubber inner member to the second member axially opposite the kit snubber member; and
    a second means for constraining lateral movement of the second snubber inner member relative to the kit member while permitting longitudinal movement of the second snubber inner member away from the first member.

12. The snubber system of claim 9 wherein the shim/spacer stack consist essentially of a plurality of metallic shims and a plurality of elastomeric spacers secured to each other as a unit.

13. The snubber system of claim 9 wherein:
    the snubber inner member has a flange extending radially outward beyond an inboard portion of the doubly convex outer surface portion.

14. The snubber system of claim 9 wherein:
    the snubber inner member one or more engagement surfaces comprise a perimeter portion of a socket and the retainer one or more engagement surfaces comprise an outwardly projecting projection.

15. The snubber system of claim 9 wherein:
    the first member is an aircraft blade flexbeam.

16. The snubber system of claim 9 wherein:
    the second member is an aircraft blade torque tube.

17. An aircraft rotor having a plurality of snubber systems of claim 9 wherein each snubber system has an associated single said first member being a rotor blade member.

18. A snubber system for permitting rotation of a rotor blade flexbeam relative to a housing member, comprising:
    a first snubber inner member having a doubly convex first outer surface portion;
    a first shim/spacer stack secured to the first outer surface portion and coupling the first snubber inner member to housing member;
    a first retainer having one or more first engagement surfaces cooperating with one or more first engagement surfaces of the first snubber inner member to constrain lateral movement of the first snubber inner member relative to the retainer while permitting movement of the snubber inner member away from the retainer and the rotor blade flexbeam;

a second snubber inner member having a doubly convex second outer surface portion;

a second shim/spacer stack secured to the second outer surface portion and coupling the second snubber inner member to the housing member opposite the first snubber member; and a second retainer having a second engagement surface cooperating with a second engagement surface of the second snubber inner member to constrain lateral movement of the second snubber inner member relative to the second retainer while permitting movement of the second snubber inner member away from the second retainer and the rotor blade flexbeam.

19. The snubber system of claim 18 further comprising:

a first elastomer securing the first retainer to the rotor blade flexbeam; and a second elastomer securing the second retainer to the rotor blade flexbeam.

20. The snubber system of claim 18 wherein said first shim/spacer stack is an outwardly doubly convex shim/spacer stack and the snubber system further comprises:

a flat shim/spacer stack coupling the outwardly doubly convex shim/spacer stack to the housing member.

* * * * *

UNITED STATES PATENT AND TRADEMARK OFFICE
CERTIFICATE OF CORRECTION

PATENT NO.    : 6,848,886 B2
DATED         : February 1, 2005
INVENTOR(S)   : David N. Schmaling et al.

It is certified that error appears in the above-identified patent and that said Letters Patent is hereby corrected as shown below:

Column 6,
Line 16, "shift/spacer" should read -- shim/spacer --.
Lines 30 and 32, "kit" should read -- first --.

Signed and Sealed this

Twenty-sixth Day of April, 2005

JON W. DUDAS
*Director of the United States Patent and Trademark Office*